United States Patent
Goodwill et al.

(10) Patent No.: US 11,465,485 B1
(45) Date of Patent: Oct. 11, 2022

(54) MODULAR HYBRID TRANSMISSION WITH SHAFT CENTERING FEATURE CONNECTED TO TORQUE CONVERTER

(71) Applicant: Schaeffler Technologies AG & Co. KG, Herzogenaurach (DE)

(72) Inventors: Edward Goodwill, Wooster, OH (US); Brandon Heitger, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/490,342

(22) Filed: Sep. 30, 2021

(51) Int. Cl.
  *B60K 6/40* (2007.10)
  *F16H 57/00* (2012.01)
  *B60K 6/48* (2007.10)

(52) U.S. Cl.
  CPC ............ *B60K 6/40* (2013.01); *B60K 6/48* (2013.01); *F16H 57/00* (2013.01); *B60K 2006/4825* (2013.01); *B60Y 2200/92* (2013.01); *B60Y 2304/072* (2013.01); *F16H 2057/0056* (2013.01)

(58) Field of Classification Search
  CPC .. B60K 6/40; B60K 6/48; F16H 57/00; F16H 2057/0056; B60Y 2200/92; B60Y 2304/072
  See application file for complete search history.

(56) References Cited

U.S. PATENT DOCUMENTS

| | | | |
|---|---|---|---|
| 2004/0112157 A1 | 6/2004 | Miller et al. | |
| 2013/0086798 A1* | 4/2013 | Frait | B60K 6/40 903/909 |
| 2013/0086897 A1* | 4/2013 | Frait | B60K 6/40 903/915 |
| 2013/0087225 A1* | 4/2013 | Frait | F16H 45/00 137/560 |
| 2013/0088105 A1* | 4/2013 | Frait | B60L 50/16 310/71 |
| 2017/0159720 A1 | 6/2017 | Armbruster et al. | |

* cited by examiner

*Primary Examiner* — David J Hlavka
(74) *Attorney, Agent, or Firm* — Volpe Koenig

(57) ABSTRACT

A method of assembling a modular hybrid transmission (MHT) is provided including (a) assembling an emotor clutch on a clutch shaft to form a clutch assembly, (b) press-fitting a bushing into a centering plate to form a centering assembly, (c) connecting the centering assembly to a torque converter, (d) assembling the torque converter to the clutch assembly with the bushing on an end of the clutch shaft, and (e) inserting the clutch assembly and the torque converter into a transmission housing while maintaining the centering of the clutch shaft to the transmission housing via the centering assembly connected to the torque converter. The assembled MHT is also provided which eliminates the needle bearing according to the prior art, avoiding the potential for damage during assembly.

12 Claims, 3 Drawing Sheets

MODULAR HYBRID TRANSMISSION WITH SHAFT CENTERING FEATURE CONNECTED TO TORQUE CONVERTER

FIELD OF INVENTION

The disclosure relates to a modular hybrid transmission that includes a clutch for the electric motor and an improved construction arrangement and assembly method.

BACKGROUND

Modular hybrid transmissions (MHTs) include an electric motor (emotor) integrated into the drivetrain. The internal combustion engine can be engaged and disengaged using an emotor clutch (commonly known as the KO clutch) in order to operate in an hybrid mode where the emotor and internal combustion engine is connected to the transmission input shaft in order to provide the motive force through the driveline to the vehicle wheels.

Assembly of MHTs is complex and includes the insertion of the assembled emotor rotor, clutch, and clutch shaft into the transmission housing where the emotor stator is already attached. This is shown in FIGS. 1 and 2 where the emotor rotor 1 is assembled with the emotor clutch 2 and the clutch shaft 3. The emotor rotor 1 is connected with the torque converter 5, and this assembly is aligned with and then slid into the transmission housing 4, as well as the previously attached emotor stator 11. The clutch shaft 3 has an end with a number of clutch seals 7, and is required to slide by a needle bearing 6 as well as a radial ball bearing 8 into the final assembled position. It is held in place here by a locking ring 9 engaged in a groove on the clutch shaft 3. A seal 10 is then located behind the locking ring 9 between the transmission housing 4 and the clutch shaft 3.

During assembly, the emotor clutch can tilt. This can result in the needle bearing 6 in the transmission housing 4 contacting and damaging the clutch seals 7, as well as possibly damaging the needle bearing 6's inner race and the needle rollers. This then requires extensive rework.

It would be desirable to improve the construction of the MHT and its assembly method in order to avoid these issues.

SUMMARY

In one aspect, the present disclosure is directed to a method of assembling a MHT which includes (a) assembling an emotor clutch on a clutch shaft to form a clutch assembly, (b) press-fitting a bushing into a centering plate to form a centering assembly, (c) connecting the centering assembly to a torque converter, (d) assembling the torque converter to the clutch assembly with the bushing on an end of the clutch shaft, and (e) inserting the clutch assembly and the torque converter into a transmission housing while maintaining the centering of the clutch shaft to the transmission housing via the centering assembly connected to the torque converter. Here, the needle bearing according to the prior art is eliminated, avoiding the potential for damage.

In one aspect, the connecting of the centering plate to the torque converter further comprises welding the centering plate to a torque converter cover of the torque converter.

In another aspect, the centering plate is a stamped sheet metal component.

In another aspect, in an assembled position, the clutch shaft is supported for rotation only by a single rolling bearing in the transmission housing on one end and by the torque converter on an opposite end.

In another aspect, the method further includes inserting a locking ring or snap ring (either being generically encompassed by the term "locking ring") on the clutch shaft to retain the clutch shaft in the transmission housing and inserting a seal between the transmission housing and the clutch shaft after the locking ring.

Additionally, an MHT assembly is also provided that can be more easily assembled without the possibility of damaging the seals that provides the required support for the clutch shaft. Here, the MHT includes a clutch assembly having an emotor clutch on a clutch shaft, a torque converter, and a centering assembly including a centering plate with a press-fit bushing in the centering plate, the centering assembly being connected to the torque converter. An end of the clutch shaft is received in the bushing. The clutch assembly and the torque converter are connected to a transmission housing with the clutch shaft being maintained centered via the centering assembly connected to the torque converter. In this arrangement, the needle bearing from the prior art assembly is eliminated, and the clutch shaft is centered by the connection to the torque converter.

In one aspect, the centering plate is welded to a torque converter cover of the torque converter.

In another aspect, the centering plate is a stamped sheet metal component.

In one aspect, the clutch shaft is supported for rotation only by a single rolling bearing in the transmission housing on one end and by the torque converter on an opposite end.

In another aspect, the MHT assembly further includes a locking ring on the clutch shaft that retains the clutch shaft in the transmission housing and a seal located between the transmission housing and the clutch shaft behind the locking ring.

It is noted that various ones of the above-noted features can be used alone or in combination with one another.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION

Figure 1:
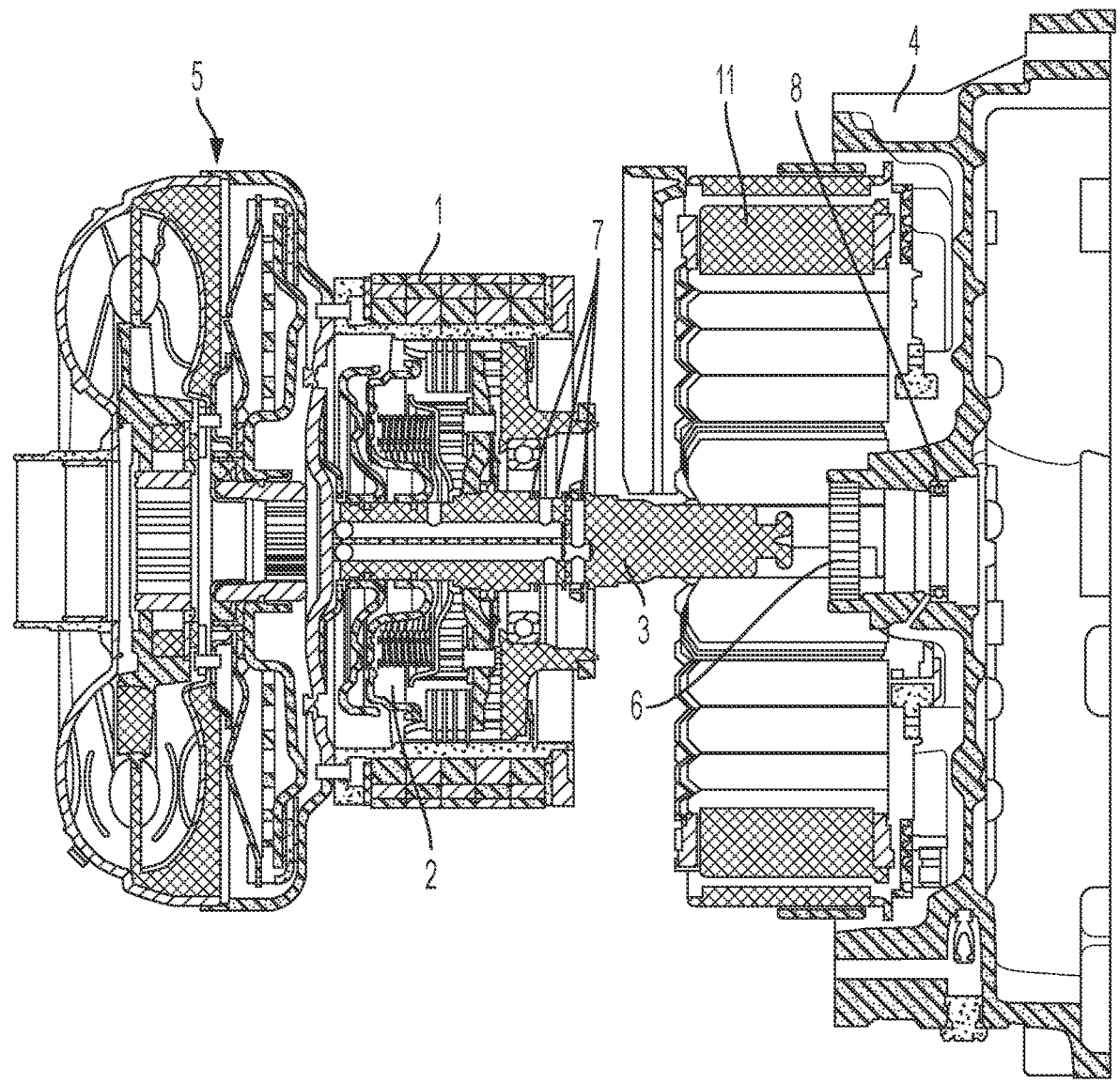
FIG. 1 is a cross-sectional view showing the assembly of an MHT according to the prior art with the emotor clutch/clutch shaft, and torque converter being inserted into the transmission housing.

Certain terminology is used in the following description for convenience only and is not limiting. The words "inwardly" and "outwardly" refer to directions toward and away from the parts referenced in the drawings. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or − 10% of an indicated value unless otherwise noted. The terminology includes the words specifically noted above, derivatives thereof and words of similar import.

Figure 2:
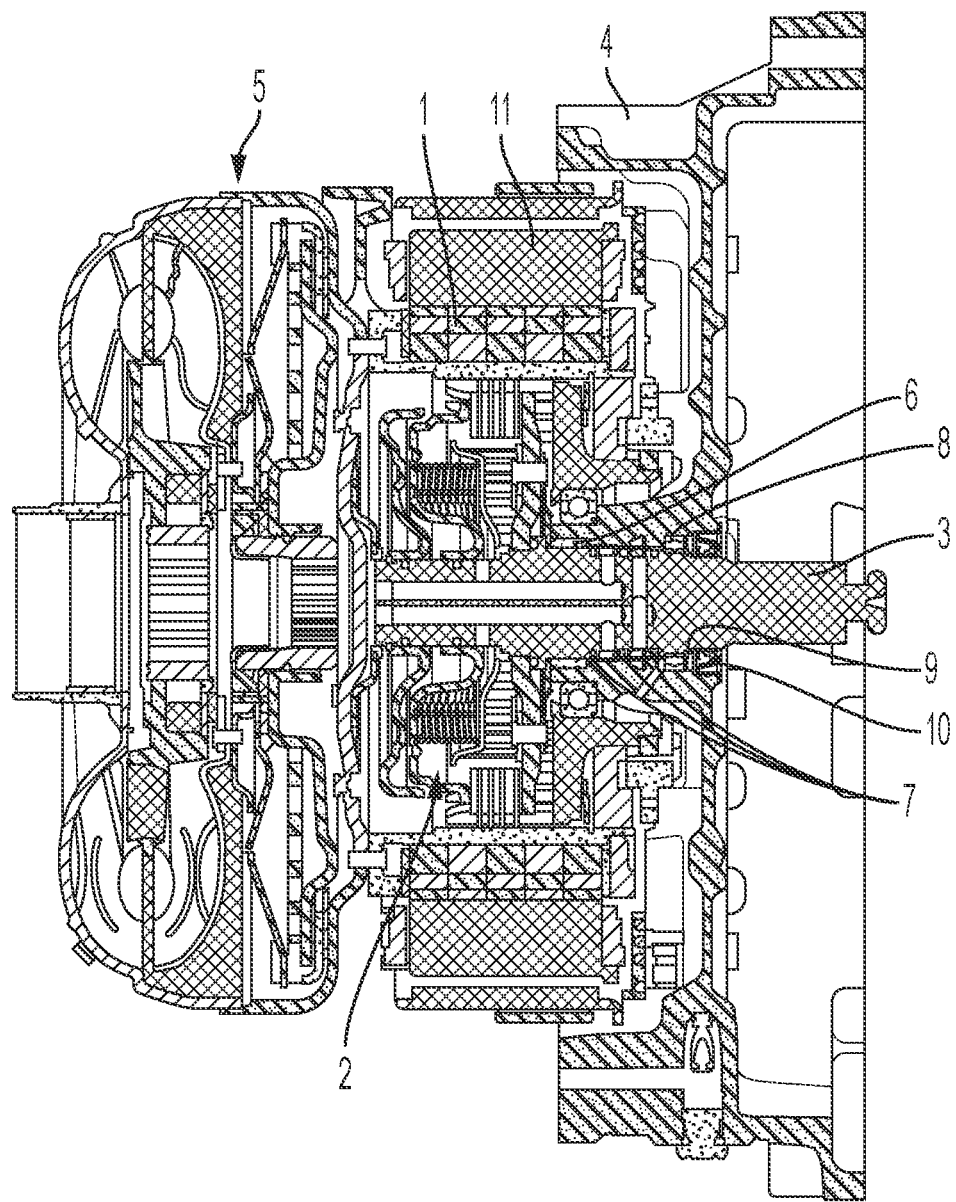
FIG. 2 is a cross-sectional view showing the assembled MHT from FIG. 1 according to the prior art.

Referring to FIGS. 1 and 2, the prior art MHT assembly and method are illustrated. Here, the emotor rotor 1 is assembled with the emotor clutch 2 and the clutch shaft 3, and this assembly is aligned with and then slid into the transmission housing 4, which requires the clutch shaft 3 with the clutch seals 7 to slide by the needle bearing 6.

Figure 3:
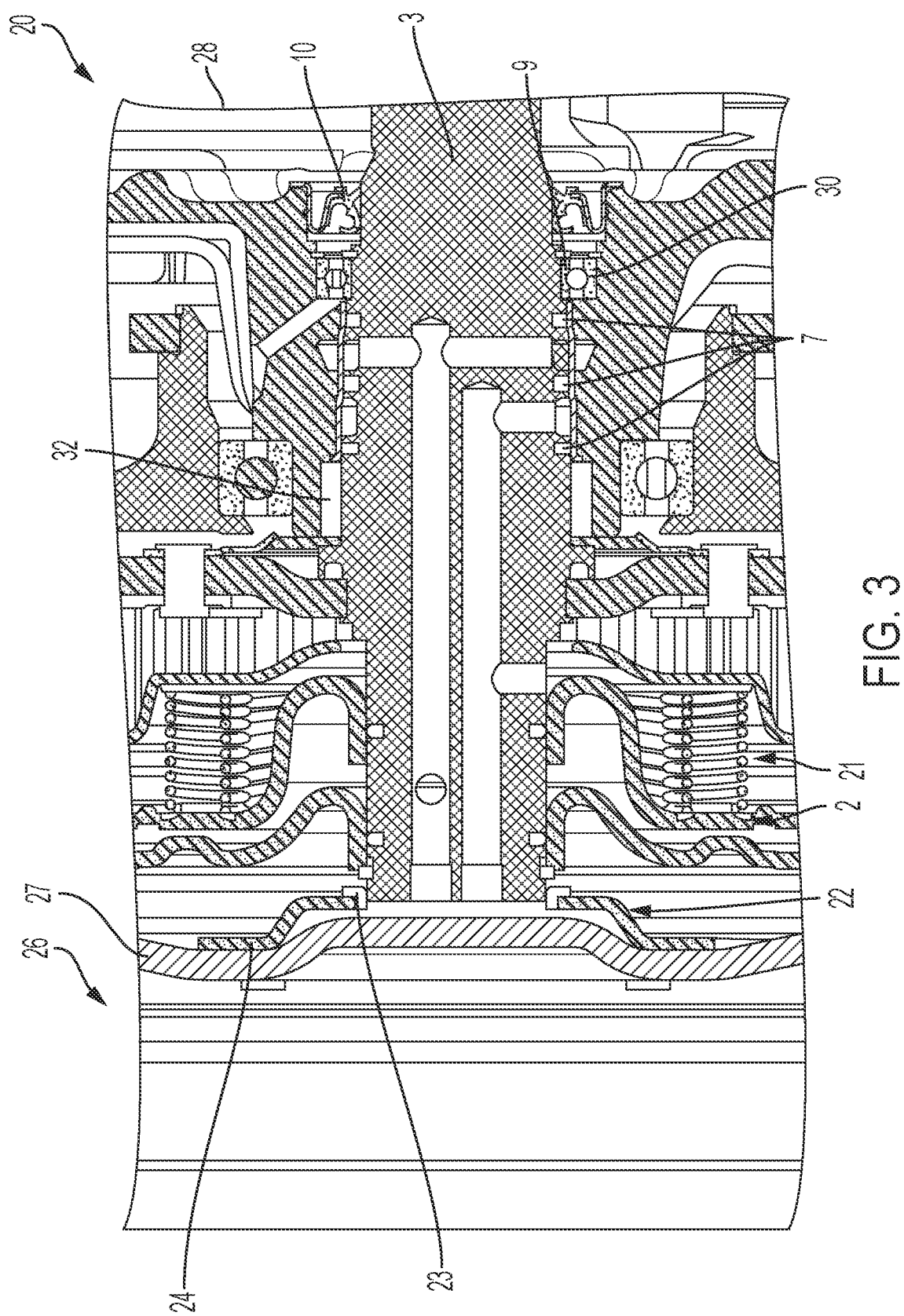
FIG. 3 is a partial cross-sectional view of an assembled MHT according to an embodiment of the present disclosure showing the differences from the prior art MHT in FIGS. 1 and 2.

Referring now to FIG. 3, the assembly of an MHT 20 in accordance with the present disclosure is explained in further detail. As shown in detail in FIG. 3, the emotor clutch 2 is assembled to the clutch shaft 3 to form a clutch assembly 21. Preferably, the emotor rotor 1 is also included in the clutch assembly 21.

Still with reference to FIG. 3, a centering assembly 22 is formed by a bushing 23 that is press-fit into a centering plate 24. This centering assembly 22 is connected to a torque converter 26. The centering plate 24 is preferably made of stamped sheet metal, and the connection of the centering assembly 22 to the torque converter 26 preferably includes projection welding or spot welding the centering plate 24 to a torque converter cover 27 of the torque converter 26. The bushing 23 is preferably made of steel or metal backed aluminum and has an interference fit with a hole in the centering plate 24 and is sized to fit on an end of the clutch shaft 3 in order to provide centering support.

The clutch assembly 21, which includes the emotor clutch 2 on the clutch shaft 3, as well as preferably the emotor rotor 1, and the torque converter 26, are then inserted as a unit into the transmission housing 28, to which the emotor stator 11 is preferably already attached, while maintaining the centering of the clutch shaft 3 to the transmission housing 28 via the connection to the torque converter 26 using the centering assembly 22. Further, as compared to the prior art assembly, shown in FIGS. 1 and 2, there is no need for the needle bearing 6 in the transmission housing 28, although a space (indicated at 32) is still provided here for lubricant flow. Accordingly, in the assembled position, the clutch shaft 3 is supported for rotation only by a single rolling bearing 30, preferably a radial ball bearing, in the transmission housing 28 on one end and by the torque converter 26 on the opposite end via the centering assembly 22 connection.

In order to complete the attachment, a locking ring 9 is inserted on the clutch shaft 3 to retain the clutch shaft 3 in the transmission housing 28. Additionally, a seal 10 is preferably inserted between the transmission housing 28 and the clutch shaft 3 after the locking ring 9.

Still with reference to FIG. 3, the result is a modular hybrid transmission assembly that includes the emotor assembly 1 having the emotor clutch 2 on the clutch shaft 3, with the end of the clutch shaft 3 being supported in the bushing 23 of the centering assembly 22 attached to the torque converter 26. The clutch shaft 3 and the emotor clutch 2, and preferably the emotor rotor 1, as well as the torque converter 26 are connected to the transmission housing 28 with the clutch shaft 3 being maintained center via the connection to the torque converter 26.

This arrangement includes the clutch shaft 3 being supported for rotation only by a single rolling bearing 30 in the transmission housing 28 on one end, as noted above, and by the torque converter 26 on the opposite end via the centering assembly 22. Based on this, assembly is simplified and the risk of damage to the seals 7 on the clutch shaft 3 are reduced.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMERALS 1 emotor rotor
2 emotor clutch
3 clutch shaft
4 transmission housing
5 torque converter
6 needle bearing
7 clutch seals
8 radial ball bearing
9 locking ring
10 seal
11 emotor stator
20 modular hybrid transmission (MHT)
21 clutch assembly
22 centering assembly
23 bushing
24 centering plate
26 torque converter
27 torque converter housing
28 transmission housing
30 rolling bearing
32 space

What is claimed is:

1. A method of assembling a modular hybrid transmission, comprising:
   assembling an emotor clutch on a clutch shaft to form a clutch assembly;
   press-fitting a bushing into a centering plate to form a centering assembly;
   connecting the centering assembly to a torque converter;
   assembling the torque converter to the clutch assembly with the bushing on one end of the clutch shaft; and
   inserting the clutch assembly and the torque converter into a transmission housing while maintaining the centering of the clutch shaft to the transmission housing via the centering assembly connected to the torque converter.

2. The method of claim 1, wherein the connecting of the centering plate to the torque converter further comprises welding the centering plate to a torque converter cover of the torque converter.

3. The method of claim 1, wherein the centering plate is a stamped sheet metal component.

4. The method of claim 1, wherein in an assembled position, the clutch shaft is supported for rotation only by a single rolling bearing in the transmission housing on one end and by the torque converter on an opposite end via the centering assembly.

5. The method of claim 1, further comprising inserting a locking ring on the clutch shaft to retain the clutch shaft in the transmission housing and inserting a seal between the transmission housing and the clutch shaft after the locking ring.

6. The method of claim 1, further comprising attaching a stator to the transmission housing.

7. A modular hybrid transmission assembly, comprising:
an emotor assembly including an emotor clutch on a clutch shaft;
a torque converter;
a centering assembly including a centering plate with a press-fit bushing in the centering plate, the centering assembly being connected to the torque converter;
one end of the clutch shaft being received in the bushing; and
wherein the emotor assembly and the torque converter are connected to a transmission housing with the clutch shaft being maintained centered via the centering assembly connected to the torque converter.

8. The assembly of claim 7, wherein the centering plate is welded to a torque converter cover of the torque converter.

9. The assembly of claim 7, wherein the centering plate is a stamped sheet metal component.

10. The assembly of claim 7, wherein the clutch shaft is supported for rotation only by a single rolling bearing in the transmission housing on one end and by the torque converter on an opposite end via the centering assembly.

11. The assembly of claim 7, further comprising a locking ring on the clutch shaft that retains the clutch shaft in the transmission housing and a seal located between the transmission housing and the clutch shaft behind the locking ring.

12. The assembly of claim 7, further comprising a stator of the emotor connected to the transmission housing.

* * * * *